United States Patent

[11] 3,586,034

[72] Inventor Michael P. Karzeniowski
75 Mapel St., Yonkers, N.Y. 10701
[21] Appl. No. 6,689
[22] Filed Jan. 29, 1970
[45] Patented June 22, 1971
Continuation-in-part of application Ser. No. 708,025, Feb. 26, 1968, now Patent No. 3,511,274.

[54] AUTOMATIC DRAINING AND LOCKING FLUID VALVE
9 Claims, 9 Drawing Figs.
[52] U.S. Cl. .................................................. 137/312, 251/199
[51] Int. Cl. ..................................................... F16k 23/00, F16k 5/14
[50] Field of Search............................................ 137/312, 596.2; 251/167, 197, 199, 203, 204

[56] References Cited
UNITED STATES PATENTS
1,360,340 11/1920 Wetzler............................ 251/199 X
2,038,132 4/1936 Robinson et al. ................ 137/312
2,631,001 3/1953 Griswold ........................ 137/312
3,050,077 8/1962 Wheatley ...................... 137/312

Primary Examiner—Henry T. Klinksiek
Attorney—Matthew M. Russo

ABSTRACT: A fluid disc valve wherein the sealing movable discs, during operation are directed in a perpendicular movement toward and away from the fixed element surface against which they seal. When in the closed position, the lower portion of the valve body is open and the upper portion vented so as to permit rapid drainage therefrom of any liquids accumulating therein. This lower opening automatically seals when the valve is open. The bottom surface of the valve body is contoured to direct the liquid therein to be discharged through a lengthwise slot provided in the valve stem which when in its lowest stage positions a portion of the slot exterior of the valve body.

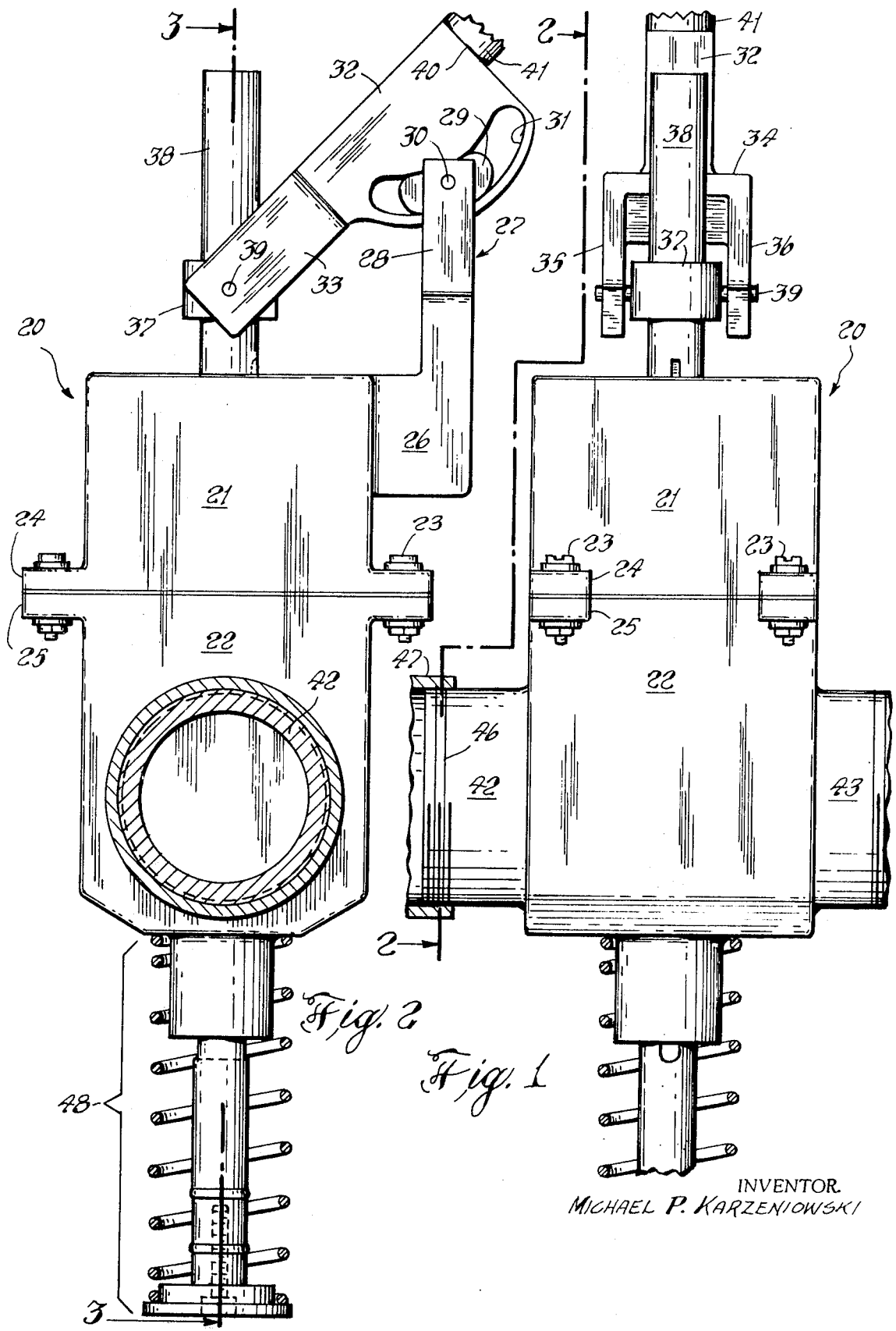

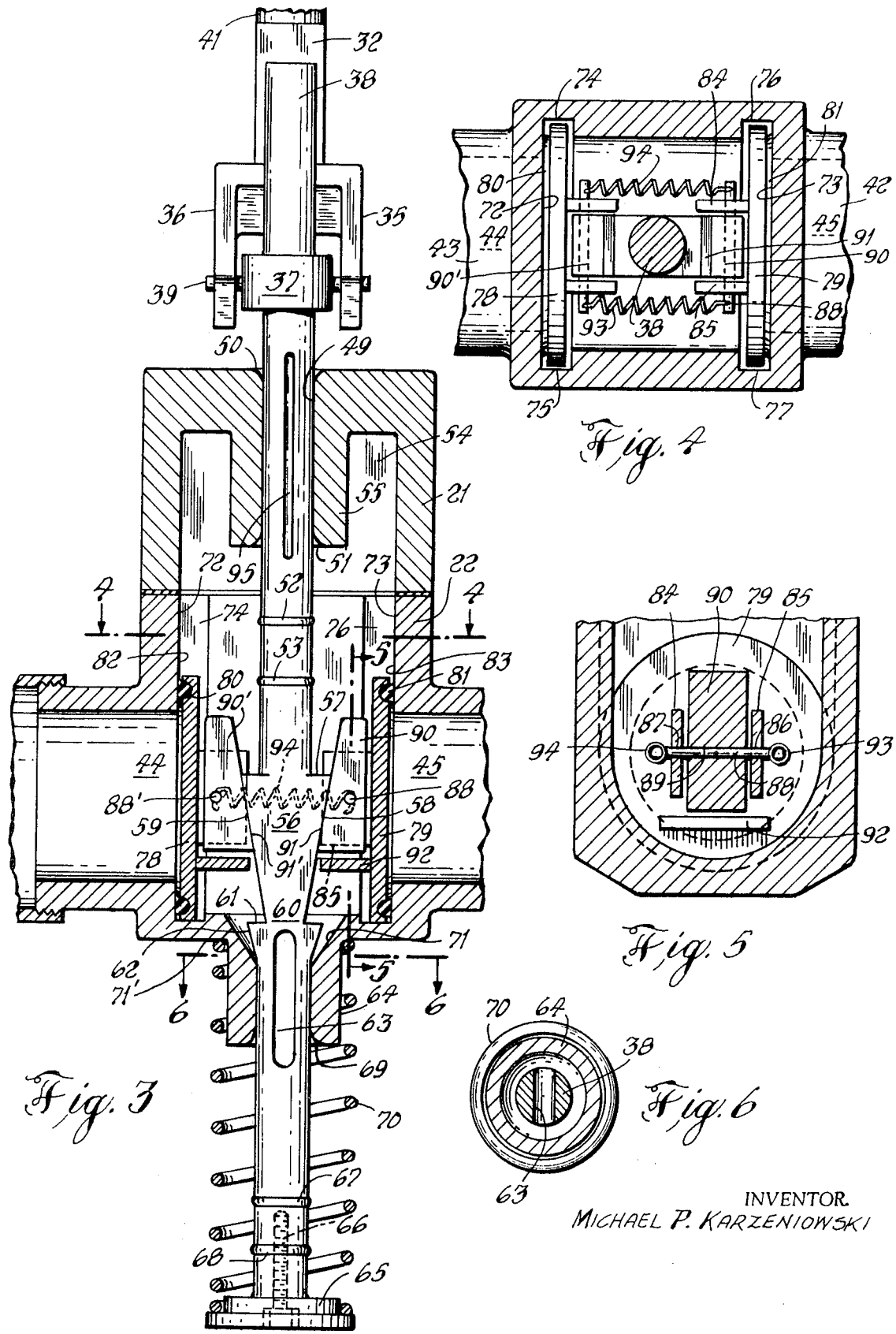

INVENTOR.
MICHAEL P. KARZENIOWSKI

AUTOMATIC DRAINING AND LOCKING FLUID VALVE

CROSS-REFERENCE TO A RELATED APPLICATION

This application is a continuation-in-part of application Ser. No. 708,025 filed Feb. 26, 1968, now U.S. Pat. No. 3,511,274 for a Self Draining and Locking Liquid Valve.

BACKGROUND OF THE INVENTION

The present invention relates to fluid valves and more particularly to a double disc valve employing rectilinear movable discs and automatic drainage in the closed position wherein the disc sealing elements are wedged directly against the seat without contacting or abrading any surface prior thereto by a pivotal cam action.

DESCRIPTION OF PRIOR ART

In the field of fluid valves and in particular to those applications where any leakage though the valve, no matter how slow, cannot be tolerated, it has been the general practice to employ the most suitable valve available and to rely entirely on replacement thereof when leakage is detected. This is the present practice used in many applications. One typical application is on motor transport vehicles which carry a supply of liquid to be mixed in transit or just prior thereto with their load. Such is the case for cement or concrete transit mix vehicles where only a specific amount of water can be added to the cement and sand and stone to provide a satisfactory mix. It is therefore clear that after the water has been added to the other constituents and the load is being mixed in transit, or on the job site, the subsequent addition of water will result in what is referred to as a "wet load." Wet loads or dumps are most prevalent on long hauls since a large percentage of valves now in use leak to some extent. This mix is totally unacceptable in view of its poor physical characteristics, in particular, strength, and must be rejected on delivery, thereby necessitating returning to the plant and disposing of the useless "wet load."

The valves used for this purpose on transit mixers do not maintain their watertight integrity over any appreciable period of time due to the fact that in closing and opening one or more of the moving sealing elements abrade one another and this action results in slow leakage. One solution to this problem has been to interpose between the source of water or tank and the rotating drum into which the water is directed, a water supply shutoff valve. This valve, however, has certain deficiencies in that instant use of the washoff hose and load mixing are not possible. In addition, it has been found that these valves also develop leaks and tend to open through constant use and vibration occasioned by road conditions as well as loading and unloading of the vehicle itself. Similar problems arise in chemical transport as well as in processing, manufacturing and other systems where slow leakage can not be tolerated.

Additional complications are inherent in equipment and in the valving system thereof. For example, during freezing conditions, especially at night when the fluids are stored and the system inactive, the fluid which accumulates within the lower portion of the valve chamber freezes as well as that in contact with the moving elements thereof. This necessitates that the valve be heated, generally with a blowtorch, before the mixer or equipment is used in the morning, since, as a general rule the valve is left open during the night to avoid freezing. In so doing, two things happen: (1) the small amount of water or fluid left in the bottom of the valve freezes and when the valve is closed in the morning before operation, it cannot close all the way; (2) when the hot water that is used during the winter weather as in mixers, melts the ice in the bottom of the valve, leaving the valve partially open, as a result a wet load before leaving the loading plant. More often then not, the valve is unintentionally left open due to the fact it is quite difficult for the operator to ascertain the operating position of the valve. This results in subsequent "wet loads" with an appreciable loss in both time and material. This invention provides a clear visible indication of the valve position as well as being automatically self-draining.

The fluid assembly feed system is provided with a packing nut component which is immersed or packed with grease to reduce the wear and tear due to abrasion and friction. Where the valve leaks, even slowly, over an extended period, the pressure on the packing nut would be increased and the grease washed away, thus subjecting the packing nut assembly to excessive wear. This is prevented by the self-draining feature mentioned above. Those concerned with the development of valves for use on "leak-free" systems have long recognized the need for a reliable automatic self-draining and self-locking valve. The present invention fills this critical need.

SUMMARY OF INVENTION

The general purpose of this invention is to provide a reliable, automatically self-draining liquid valve that has all the advantages of similarly employed prior art devices without any of the above-described disadvantages or limitations To attain this, the present invention provides a self-locking disc valve having a unique arrangement of components wherein the sealing discs are operable in a vertical direction for alignment with their respective valve seats by a shaft or stem which is biased in one position. The discs subsequently are moved toward and away from the seats by a unique cam arrangement in a direction perpendicular thereto and are locked in their closed position by the shaft. In the closed position the lower portion of the valve chamber is automatically permitted to drain off any liquid accumulated therein by the slot provided in the lower portion of the shaft and a coacting vent on the upper portion of the shaft.

An object of this invention is to provide a reliable, simple, inexpensive self-locking and draining valve which employs a minimum of components and which is free of inherent frictional abrasion of the valving surfaces during opening and closure.

Another object is to provide a fluid valve which is self-draining and whose open or closed positions are readily ascertainable and which may be locked in the closed position.

Still another object is to provide a fluid valve that will drain rapidly and reliably when in the closed position.

Other object and features of the invention will become apparent to those skilled in the art as the disclosure is made in the following description of a preferred embodiment of the invention, as illustrated in the accompanying drawings.

BRIEF DESCRIPTION OF THE DRAWINGS

In the accompanying drawings:

FIG. 1 is a front elevation, with the operating handle partially broken away, of an embodiment of a valve made in accordance with the principles of this invention;

FIG. 2 is a side elevation of said valve taken approximately along 2-2 of FIG. 1;

FIG. 3 is a cross section view taken approximately along 3-3 of FIG. 2;

FIG. 4 is a cross section view taken approximately along 4-4 of FIG. 3;

FIG. 5 is a cross-sectional view taken approximately along 5-5 of FIG. 3;

FIG. 6 is a cross-sectional view taken approximately along 6-6 of FIG. 3,

DESCRIPTION OF THE PREFERRED EMBODIMENTS

Figure 7:
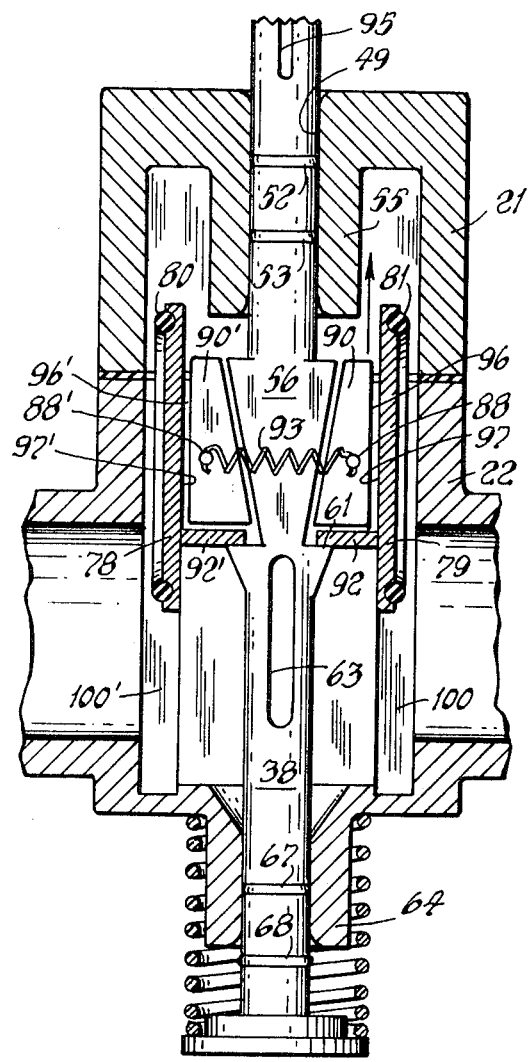
FIG. 7 is a cross-sectional view showing the discs and shaft in its travel intermediate the open and closed positions; and, FIG. 8 is a cross-sectional view showing the discs and shaft immediately prior to the fully closed position.

In the illustrated embodiment of the invention shown in FIG. 1, the valve 20 comprises an upper chamber 21 and a lower chamber 22 which are affixed to one another by bolts 23 passing through aligned extending flanges 24 and 25. A gasket (not shown) may be interposed between the peripheral abutting faces of the chamber flanges where high-pressure fluids are to be encountered. As also illustrated in FIG. 2, the upper chamber 21 carries on its outer surface an upstanding support bracket arm 26 whose upper end forms a yoke 27 with a pair of arms (only 28 visible) which in turn carry therebetween a sliding cam member 29. The cam 29 is pivotally supported in the yoke 27 on a pin 30 passing through the arms and central of the cam. The cam 29 rides in a generally arcuate slot 31 of the pivoting operating member 32 whose forward end 33 is formed as a yoke 34 with arms 35 and 36. Disposed between the yoke arms 35 and 36 is a boss element 37 which is provided with a central aperture through which the valve operating shaft or stem 38 passes. Shaft pin 39 passes through the yoke arms, the boss 37 and the shaft 38 thereby permitting pivotal movement of the yoke about the boss and shaft. The opposite end 40 of the member 32 carries an extending handle 41 (broken away) for operation of the shaft. The handle 41 is shown in its upper position with the valve closed and the shaft in its lowermost travel. As the handle is depressed the member 32 effectively rotates about the cam 29, and the yoke portion 33 thereof pivots and translates upwardly carrying with it the boss 37 and shaft 38. The camming action in the circular slot 31 results in a biasing action at its end so that the shaft is held in or biased at its upper and lower travel positions.

The lower chamber 22 is provided with a pair of oppositely and outwardly directed pipe nipples 42 and 43 over the valve ports 44 and 45 (see FIG. 3) and serve to couple the valve between a source of fluid and the fluid load. These are provided with coupling threads 46 at the end thereof for attachment to antoer another 47. The bottom of the lower chamber carries an automatic valve drainage assembly 48. The chamber hosing can be fabricated of any suitable metal or allow such as brass which is quite common and well-known in the art.

FIG. 3 illustrates the spacial relationship, in cross section, of the internal arrangements of the valve components when the valve is in the closed position. The shaft or stem 38 slidably passes through an upper opening 49 in the upper chamber housing 21. The entrance and exit portions of the opening 49 are chamfered or beveled as at 50 and 51 to permit the upper O-rings, 52 and 53 carried by the shaft, to gain easy passage therein. The upper chamber 21 is formed with an internal annular plenum 54 leaving a central support column 55 through which the shaft moves and into which the O-rings 52 and 53 seat. These O-rings can also be disposed on the internal surface of column 55. The midlower portion of the shaft 38 is formed into an enlarged portion 56 having an upper shoulder 57 and a pair of depending oppositely directed side cam faces 58 and 59 which are downwardly convergent. At the lower end 60 the shaft is flanged outwardly to form an annular shoulder 61 and then the shaft surface again converges downwardly at 62 until it assumes its approximate upper configuration.

From approximately 62 on down the shaft is provided with an elongated slot 63 which passes therethrough and is slightly longer than the tubular extension 64 of the lower chamber 22 through which the shaft passes. Releaseably affixed to the end of the shaft is an annular spring flange retainer 65 which can be held as by screw 66 threaded into a central bore in the shaft. Lower O-rings 67 and 68 are carried by the shaft and when the shaft is in its upper position pass into the extension 64 though the bevel 69 thereof. These O-rings similarly could be disposed on the inner wall of extension 64. A closed biasing spring 70 is disposed about the lower shaft portion between the outer base surface 71' of chamber housing 22 and the retainer 65. This spring 70 effectively biases the valve into, and holds it in the closed position while permitting fluid in the lower chamber to drain out through the shaft slot 63 which extends from within the chamber to the outside environment.

The lower inner sidewall 71 of the chamber 22 is inwardly conically convergent so as to insure complete drainage.

Referring now to both FIG. 4 and FIG. 3, the opposite inner planar walls 72 and 73 of both chambers are formed so as to provide vertically extending channels or guides 74 and 75 in one wall 76 and 77 in the opposite wall. These channels extend over the inlet and outlet ports 44 and 45 over which the pipe nipples. 42,43 extend. A pair of circular disc members 78 and 79 are disposed within the channels and are relatively free to move toward and away from their respective ports. Each of the discs is provided with an O-ring 80 (81) seated within the disc and extending slightly outward thereof to provide positive seat thereof against the inner wall 82 (83) of the lower chamber proximate its port. This inner wall 82 (83) about the port maybe a valve seat in order to facilitate better sealing when necessary.

Now, also referring to FIG. 5 as well as FIGS. 3 and 4, the disc 79 as well as the other disc, carries a pair of spaced apart, inwardly extending arms 84 and 85 on its inner face. These arms are affixed thereto and are centrally apertured. These apertures 86 and 87 are aligned and have disposed therein a cam support shaft 88 whose ends have retaining means such as as cotter pins. Supported for free rotational movement on the shaft 88 via an aperture 89 is a cam member 90. The cam member has in inwardly angled face 91 which is angularly complementary to the cam face 58 (59) of the operating shaft portion 56 for coaction therewith. Each disc also carries a hold member 92 which is positioned below and central of the cam member 90 and extends outwardly of the disc. Since each disc is relatively free to move within its respective channel, inwardly biasing springs 93 and 94 are provided and affixed between the disc arms at their respective shaft ends. These springs urge the discs toward the central shaft and maintain an abutting relation between the camming surfaces of the operating shaft and the disc cams 90 and 90'.

Considering first the situation where the shaft or stem has been fully retracted (See FIG. 7 although illustrated with partial retraction) so that the valve is open and the inlet and outlet ports are in direct, unobstructed full communication with the lower chamber and with each other. The discs are supported in the upper portion of their channel guides by the abutment shoulder 61 of the shaft in direct contact with the hold member 92 of each disc. Thus it is quite clear that in the upward travel of the operating shaft disc. Thus it is quite clear that in the upward travel of the operating shaft it carries upwardly therewith both discs in to their channels. In this retracted position, the venting groove 95 in the upper portion of the shaft 38 is external of the inside of the upper chamber 21 and both O-rings 52 and 53 are in sealing position within the opening 49. The slot 63 is disposed within the valve and O-rings 67 and 68 seal the lower drainage opening of the valve. As the operating shaft is lowered from its retracted position, it carries with it the discs and the cams which abut their respective camming surfaces of portion 56. These cams are disposed on their shafts 88 so that their rear surfaces 96 are slightly spaced from the rear disc face 97 so as to permit limited pivoting of the cam.

Figure 8:
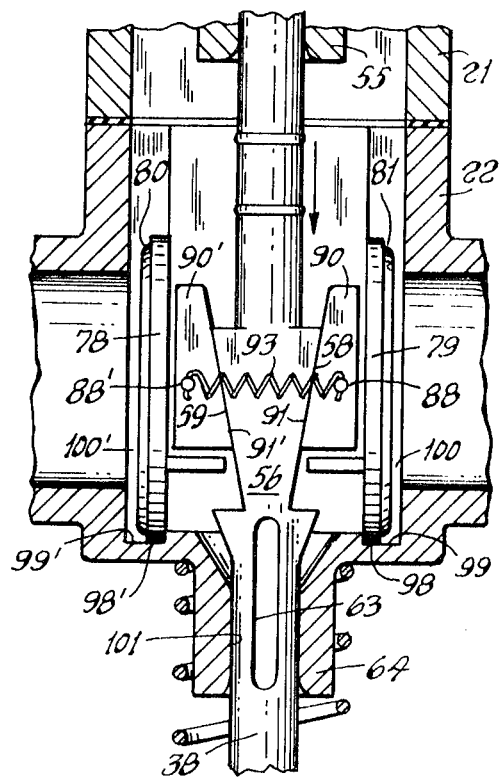

The shaft 38 continues its downward travel and at the lowermost position of the discs, as illustrated in FIG. 8, the peripheral edge 98 of each disc contacts the base 99 of recess 100 of the lower chamber 22. During this downward excursion, the discs have not contacted any surface on their sealing faces since they fit loosely into their respective guide channels and are urged inwardly by the springs 93 and 94. When the discs have terminated their downward travel and abut the base 99, the lower drain slot 63 is still within the chamber. Thereafter the operating shaft continues its downward travel as shown, with the slot 63 still within the aperture 101 of the tubular extension 64 thereby preventing drainage while the valve is still partially open.

Further depression of the operating shaft 38 results in a number of simultaneous coactions which are clearly delineated in FIG. 3. The camming action of cam faces 91

(91') against the side cam faces 58 and 59 of the shaft portion 56 as it travels downwardly transmits an outwardly perpendicular force to the cam supporting shafts 88 (88') which are central of the discs. Thus a force is exerted at the center of each disc to impart thereto a perpendicular movement to linearly translate the discs into sealing arrangement with their respective valve walls and to tightly abut and compress the sealing rings 80 and 81 thereagainst. The operating shaft terminates its downward travel when the discs seal and thereby (cannot move outwardly) prevent further camming action. At this point the drainage slot 63 is disposed so that its upper portion is within the lower chamber 22 and its lower portion exterior of the valve All the fluid within the valve drains out therethrough extremely rapidly since the vent groove 95 communicates between the valve chamber or plenum and the outside environment.

Figure 9:
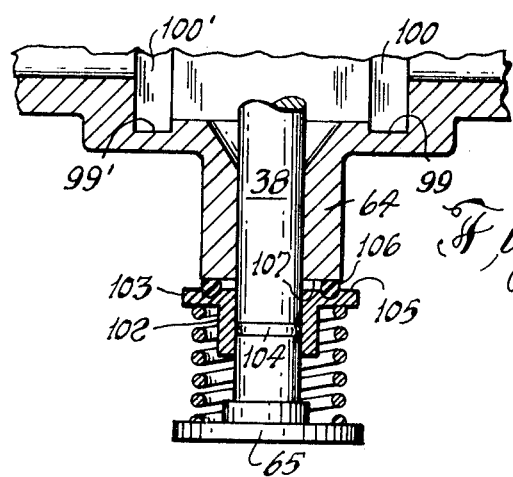
FIG. 9 is a cross section view showing another embodiment of the drainage closure assembly.

FIG. 9 illustrates an alternate method for sealing the drainage assembly wherein the shaft 38 is provided with a coaxial tubular section 102 having an outward extending circular flange 103. The section 102 may be tightly threaded onto the shaft or it may be provided with an O-ring 104 for sealing therebetween. The upper face 105 of the flange is recessed and carries therein a sealing O-ring 106 which seals against the base face 107 of the valve extension 64. This arrangement permits shortening of the operating shaft.

It should be understood, of course, that the foregoing disclosure relates to only a preferred embodiment of the invention and that numerous modifications or alterations may be made therein without departing from the spirit and the scope of the invention as set forth in the appended claims.

I claim:
1. A fluid valve comprising:
 a valve casing body having,
  a plenum chamber therein,
  lower opposed inlet and outlet ports,
  a pair of vertically opposed openings; one in the lowermost portion of said body, and the other at upper portion thereof,
  a shaft reciprocable in said valve and extending out of said valve through said vertically opposed openings and having proximate the center thereof an opposing pair of wedgelike camming surfaces, said shaft being provided with an outwardly directed abutment shoulder therebelow and a vertically extending drainage slot therethrough,
  a pair of vertical guide means extending across and beyond said inlet and outlet ports for each loosely confining therein,
  a valve disc for free vertical movement in each of said guide means, having port sealing means, and each carrying,
  a pivotally supported camming means directed inwardly for coacting with said shaft camming surface,
  an inwardly extending hold member disposed below said camming means for coacting with said abutment shoulder,
  disc biasing means urging said discs toward one another,
  means for selectively reciprocating said shaft,
  fluid sealing means for sealing said opposed vertical openings when said shaft is in its upper position and said ports are open,
  whereby when said shaft is in its uppermost position said discs are retracted, said valve ports are open, said slot is entirely within said body and said opposed opening are fluid sealed, when said shaft travels downwardly into said valve carrying therewith said discs supporting them on said abutment shoulder by said hold member and upon said discs terminating their downward travel and are opposite their respective ports further movement by said shaft will urge said disc outwardly due to the camming action and into sealing contact about their respective ports and said slot will be partially outside of said valve thereby draining any fluids therein.

2. The valve according to claim 1 further including a vertically extending vent grove proximate said upper opening whereby when said shaft is in its lower position said groove will communicate between said plenum and the exterior of said valve.

3. The valve according to claim 1 wherein said pivotal camming means comprises:
 a pair of spaced arms affixed to and extending out from the inner face of each of said discs,
 a rod supported therebetween,
 a cam member axially supported on said rod for free rotation thereabout and having a camming surface directed toward said shaft,
 and said disc biasing means are springs connected between said rods.

4. The valve according to claim 3 wherein said fluid sealing means are O-rings disposed intermediate said shaft and the walls of said openings.

5. The valve according to claim 4 wherein each of said ports are provided with valve seats thereabout and said port sealing means are O-rings disposed intermediate the outer face of said disc and said valve seat.

6. The valve according to claim 5 further including shaft biasing means urging said shaft into its lower position.

7. The valve according to claim 6 wherein said shaft biasing means include:
 an outwardly extending flange carried by said shaft at its lower end,
 a coil spring disposed about said shaft having one end thereof abutting said flange and the other end abutting the outer lower wall of said body.

8. The valve according to claim 7 wherein said guide means are vertical channels formed on the inner opposed walls of said body and said wall about said lower opening formed to conically converge theretoward.

9. The valve according to claim 8 wherein said means for selectively reciprocating comprises:
 an operating member having one end thereof pivotally connected to the upper portion of said shaft and having an arcuate guide slot therethrough intermediate of its end,
 a sliding cam disposed in said slot for movement therein,
 an arm rigidly connected to said body and pivotally supporting said cam,
 whereby when the free end of said member is moved said member will pivot in accordance with the camming action of said cam in said guide slot and reciprocate said shaft.